United States Patent [19]

Endriz

[11] 3,867,662

[45] Feb. 18, 1975

[54] GRATING TUNED PHOTOEMITTER

[75] Inventor: John Guiry Endriz, Princeton, N.J.

[73] Assignee: RCA Corporation, New York, N.Y.

[22] Filed: Oct. 15, 1973

[21] Appl. No.: 406,183

[52] U.S. Cl. .................................................. 313/94

[51] Int. Cl. .............................................. H01j 39/00

[58] Field of Search ........... 313/65 R, 65 T, 94, 96, 313/97, 101

[56] References Cited

UNITED STATES PATENTS

| | | | |
|---|---|---|---|
| 3,043,976 | 7/1962 | Kossel | 313/94 |
| 3,163,765 | 12/1964 | Niklas | 313/101 X |
| 3,585,433 | 6/1971 | O'Keefe | 313/94 |
| 3,588,570 | 6/1971 | O'Keefe | 313/94 |

*Primary Examiner*—James B. Mullins
*Attorney, Agent, or Firm*—Glenn H. Bruestle; R. J. Boivin

[57] ABSTRACT

A nonthermionic photoemissive material is provided on a major surface of a metal-like grating upon which light impinges.

17 Claims, 4 Drawing Figures

GRATING TUNED PHOTOEMITTER

BACKGROUND OF THE INVENTION

The present invention relates to photoemissive materials and more particularly to non-thermionic photoemitters of the type used in electron tubes.

The use of non-thermionic photoemitters to detect electromagnetic energy is well known in the art. The use and preparation of photoemissive materials for non-thermionic photoemitters, in general, is discussed by A. H. Sommer in *Photoemissive Materials*, John Wiley and Sons, Inc., 1968. In selecting an appropriate photoemissive material for photoemitter detectors, a comparison is required of the relative magnitudes of the respective quantum yields (expressed in terms of electrons emitted per incident photon) of the various available photoemissive materials at the wavelengths of interest. Certain other factors, for example ease of manufacture and/or expense, may also be important. In general, for longer wavelengths exceeding 1 micron there are few inexpensive and easily fabricated photoemitters having adequate yield for many applications. The photoemissive materials which are available are in general, expensive and/or difficult to manufacture or fabricate. For this reason, the silver-oxygencesium photoemissive material (S-1 photocathode) is often utilized for applications requiring photoemission at the longer wavelengths approximating 1 micron even though its quantum efficiency is less than 10 percent at that wavelength.

With the advent of lasers, inexpensive improved photoemissive detectors for wavelengths approximating and exceeding 1 micron are especially desired.

In lieu of developing new photoemissive materials for the above mentioned applications, various techniques have been sought for enhancing the yield of existing photoemissive materials. One approach to improving the yield of known photoemissive materials such as for example, the S-1 photoemissive material, involves for instance, modification of the geometry of the photoemitter structure. An example of this technique is the construction of a photoemitter which is capable of improving the light absorption by the photoemissive material, and more particularly, the absorption of the component of light which ordinarily impinges upon the photoemissive material and is reflected. This approach to yield enhancement has generally involved a multiple internal reflection structure, as described, for example in the following U.S. Pat. Nos. 3,513,316 issued to T. Hirschfeld on May 19, 1920; 3,700,947 issued to G. W. Goodrich on Oct. 24, 1972; and 3,043,976 issued to D. Kossel on July 10, 1972. This approach to yield enhancement is inadequate for most applications since it requires major structural modifications of the photoemitter and/or lacks significant yield enhancement at the frequencies of interest.

SUMMARY OF THE INVENTION

A modified photoemitter is provided which includes photoemissive material and a highly reflective medium for exciting surface wave propagation along the surface of the photoemissive material. The medium includes surface discontinuities having a periodicity substantially equal to the wavelength of the surface wave(s) excited. The periodicity of the discontinuities may be varied to obtain tuned peaks of enhanced photoemissive yield at predetermined and adjustable frequencies or wavelengths.

DETAILED DESCRIPTION

I — GENERAL THEORY

Figure 1:
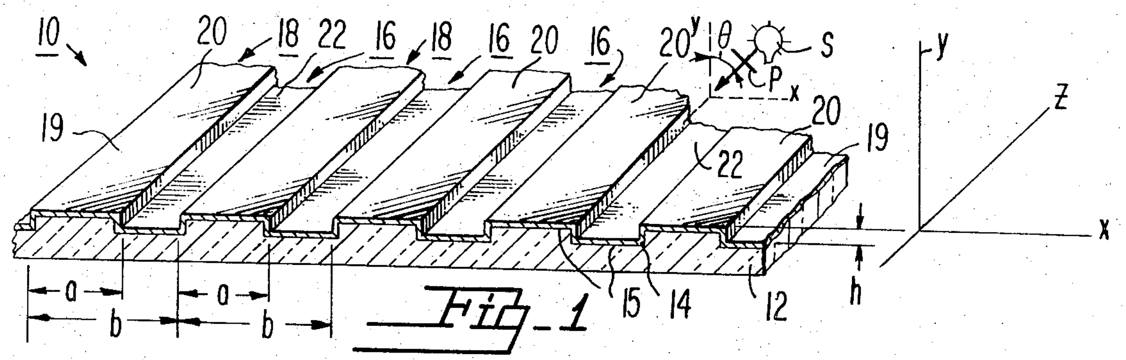
FIGS. 1-3 are cut-away perspective views of alternate embodiments of a reflective mode photoemitter in accordance with the present invention.

The invention herein described and exemplified in the embodiments of Examples 1-3 is broadly illustrative of a generic approach to photoemissive enhancement which is applicable to a wide range of existing photoemissive materials. Broadly, the enhancement technique involves the inclusion of a reflective medium within a photoemitter to excite surface waves which propagate along and decay into a photoemissive material included as part of the photoemitter. I have found that if the medium of such a photoemitter includes a highly reflective grating surface having almost imperceptable changes or discontinuities of selected dimensions and periodicity, a significant and anomalous enhancement of photoemission is possible which is particularly strong at the longer wavelengths of response for that photoemissive material. Importantly, enhanced photoemissive yield may be accomplished at predetermined wavelengths depending upon the periodicity selected for the discontinuities of that grating surface.

Theoretically, it is believed that the photocathode structure (photoemitter) herein described enables the coupling of light wave energy from an incident light wave, impinging on the reflecting surface, into so called "surface waves", "evanescent waves" or "surface plasmons" which are then confined (trapped) to propagate along the grating surface and photoemissive material. The specific geometry of the grating predetermines the light wavelengths at which this "coupling phenomenon" (i.e., coupling to surface waves) will occur.

In its simplest form, a photoemitter may be designed to allow surface wave coupling at single discrete wavelengths, as shown, for example in Example I. Numerous structural variations and improvements may be provided to allow surface wave coupling at a multiplicity of wavelengths as hereinafter described. Whatever the photoemissive structure utilized to excite these surface waves, a particular medium (i.e., grating configuration and composition) is required to induce the coupling phenomenon previously described and to support the surface waves created thereby. The medium must be highly reflective, that is, have a reflectance exceeding 60 percent at the wavelength of interest. For a given reflective medium of this type, there exists a fixed definable relationship between the wavelength of the surface wave which is excited to propagate thereon and its frequency. This relationship is a complex but predictable analytical function of the optical constants of the medium. This function may be found in the scientific literature or determined experimentally. Thus, for a given frequency of incident light impinging on the novel photoemitter, there exists a single defined surface wavelength (i.e., a "resonant" surface wave) to which that incident light beam can couple.

Assuming that the light beam impinges normal to the surface wave supporting medium, then the coupling of the light beam into the resonant surface wave at that discrete frequency is accomplished by providing discontinuities in a grating-like surface on the medium such that the grating periodicity is equal to that of the surface wave (i.e., its wavelength). For light impinging at oblique angles to the supporting medium, the periodicity of the grating required to couple the same incident light beam to the surface wave changes, but is a predictable function of the incident light wavelength, surface wavelength, light polarization and its angle of incidence relative to the discontinuities of that grating.

With the photoemitter herein disclosed, the surface wave, once excited, is a "trapped wave" the energy of which is derived or absorbed from the incident light wave and which can only decay by being absorbed into adjacently disposed photoemissive material. Most importantly, however, the quantum of energy absorbed by the photoemissive material at selected frequencies of interest gives rise to an anomalous increase in electron emission. Theoretically, there are two primary reasons for this anamalous increase in electron emission. First, there is a certain increased absorption by the photoemissive material of a quantum of the incident light which is ordinarily reflected from prior art photoemitters, and second the absorption of surface waves by the photoemissive material proves more effective in exciting electron emission than does light which is directly absorbed into the same material without first exciting surface waves thereon.

The discrete light wavelengths at which a significant increase in photoemissive yield occurs due to coupling of the incident light beam to surface waves on the medium may be varied by changing the grating periodicity. Also, for a given grating periodicity, the wavelength of incident light at which this increase occurs may be varied by changing the angle of light incidence relative to the discontinuities of the grating.

Figure 4:
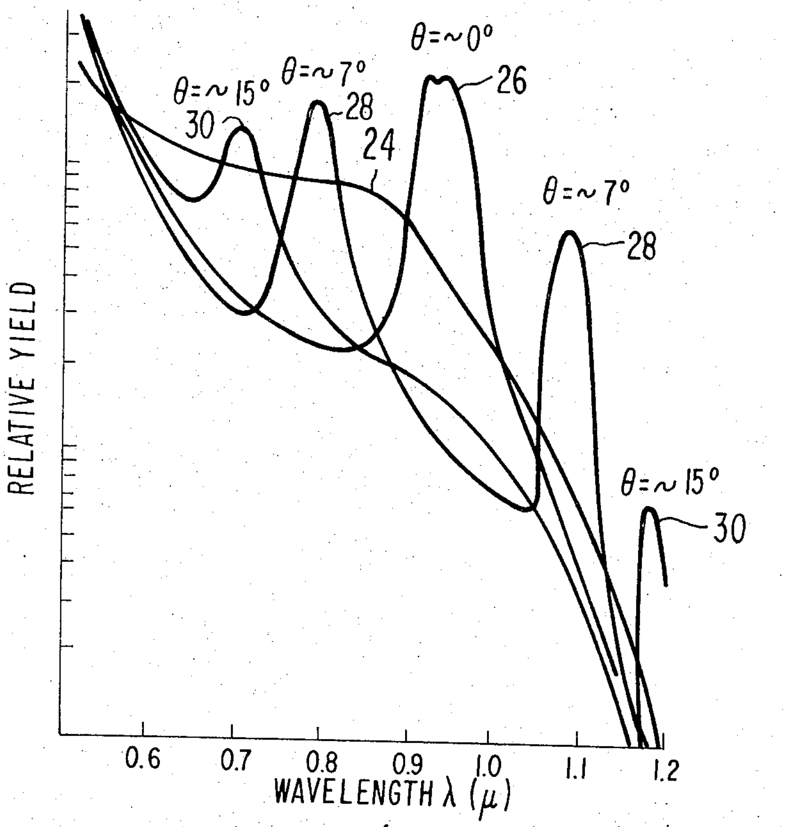
FIG. 4 is a semilogerithmic graph comparing experimental data for the relative yield of the novel photoemitter of Example 1 with a prior art flat photoemitter including the same photoemissive material prepared in the same manner.

Importantly, imperical evidence, such as depicted in FIG. 4, incidates that the wavelengths of greatest yield enhancement for the novel photoemitter are the longer wavelengths of response (i.e., wavelengths approaching threshold) for the photoemissive material selected.

Previous experimental evidence for some of the phenomenon described herein may be found in the scientific literature. Pertinent references, for example, describing the existance of surface waves are:

Wood, R. W., Phil. Mag. Vol. 4, page 393, (1902).

Lord Rayleigh, Phil. Mag. Vol. 14, page 60, (1907)

Fano, V. Journal Opt. Soc. Am. Vol. 31, pages 213–222, March, 1941

The first experimental evidence substantiating anamalous increases in photoemitted electrons as a result of decaying surface waves is found in:

Endriz, J. G. et al. Phys. Rev. Lett. Vol. 24, page 64 (1970)

Evidence that photoemission arising from absorption of surface waves is of a fundamentally different nature and intrinsically stronger than photoemission arising from the absorption of the same amount of directly impinging light energy is found in:

Endriz, J. G. et al., Phy. Rev. Lett. Vol. 27, page 570 (1971)

EXAMPLE I

Referring generally to FIG. 1, a reflective mode photoemitter 10 is shown which includes a glass substrate 12 and a photoemissive material 14 on a major surface 15 of the substrate 12. The substrate 12 is prepared, for example by using photoresist exposure and etching techniques well known in the semiconductor art to include slotted regions 16. Exposure of the photoresist is preferably accomplished with the interference pattern of two interferring laser beams; however, other exposure methods may be utilized. The material of the substrate 12 is not critical and may comprise numerous other self supporting materials. The slotted surface regions 16 are alternately interrupted by the non-slotted regions 18, thereby forming a slotted major surface 15 on the substrate 12.

A photoemissive material 14 of substantially uniform thickness is formed on the slotted major surface 15 in a manner known in the art. The preparation of several photoemissive materials, is for example, described in the above-referenced work by Sommer. A grating surface is thereby formed on a major surface 19 of the photoemissive material 14 which includes a plurality of "discontinuities" along a cross section X consisting of pair combinations of the alternating spaced-apart regions or strips 20 and 22. Preferably, the depth h of the surface discontinuities formed by regions 20 and 22 is approximately 100A; however, the depth h may be varied between approximately 5A and 500A without deviating from the inventive concept.

Viewed progressively along the cross-section shown in FIG. 1, (in the direction X), each consecutive pair combination of the alternating regions 20 and 22, forms a single discontinuity on the major surface 19 which is of approximately equal width (i.e., dimension $b$ shown in FIG. 1). Thus, the discontinuities repeat with substantially equal periodicity across the major surface 19. In this example, the pair combinations of regions 20 and 22 are formed in a noncritical manner to be substantially rectangular in shape along the axis X and parallel along the axis Z. It is believed the shape of the discontinuities may vary substantially without incurring substantial adverse effects. Similarly, the aspect ratio or the ratio of distances $a/b$ of the discontinuities preferably is about 0.5; however, it is believed that any aspect ratio may be utilized without incurring substantial adverse effect. The dimension $b$ is considered critical since it establishes the periodicity of the discontinuities formed by alternating regions 20 and 22. In the case of Example 1, the grating dimensions were established (selected) to be approximately as follows $a$=6000A, $b$=8800A and $0.2 < a/b < 0.7$. In general, the periodicity $b$ of the grating is selected to establish a tuned peak on the photoemissive yield curve as hereinafter clarified.

The photoemissive material 14 preferably consists of a silver-oxygen-cesium (S-1) photoemissive material; however, other "metal-like" non-thermionic photoemissive materials may be utilized. A "metal-like" material as herein defined is one which is highly reflective. Generally such materials include one or more of the highly reflecting metals such as silver, gold, aluminum, magnesium, the alkali metals and/or materials which display substantially similar characteristics of reflectivity as these metals.

Typically, a photoemitter, such as shown, is mounted within an evacuated envelope. In the operation of a device incorporating such a photoemitter, light from a source S, for example, is focused to impinge upon the photoemissive material 14 so that electrons are emitted therefrom.

Test results for the novel device of Example I are shown in FIG. 4. Curve 24 of FIG. 4 graphically depicts the measured yield of a prior art S-1 photoemitter for various wavelengths of impinging light formed on a substantially flat (i.e., without surface discontinuities) glass substrate similar to the substrate 12. Curves 26, 28 and 30 depict the relative yield curves of the novel photoemitter of Example I (including a comperable S-1 photoemissive material as that formed on the prior art photoemitter from which the date of curve 24 was obtained) for the same wavelengths of incident light. The photoemissive material for the tested prior art and novel photoemitter was formed and prepared simultaneously. Measurement of each of the respective yield curves of FIG. 4 was accomplished under like conditions with comparable equipment. In each case, the light from the same light source S was polarized by the filter P and focused to impinge upon a major surface of the S-1 photoemissive material. However, in the case of the novel photoemitter of Example 1 (curves 26, 28, 30), the polarized light was focused to impinge upon the major surface 19 of the S-1 photoemissive material 14 in a plane of incidence (parallel to plane X–Y) substantially perpendicular to the plane X–Z and axis (direction Z) of the grating discontinuities of the major surface 19. The light was "*p*-polarized" (i.e., its polarization was in the plane of incidence) and focused to impinge perpendicular to the direction of discontinuities of regions 20 and 22.

The curves 26, 28 and 30 depict the relative yield of the novel photoemitter at various angles of incidence $\theta$ for the *p*-polarized light with respect to the normal direction Y. As shown in FIG. 4, the yield of the novel photoemitter 10 is significantly improved at specific wavelengths which depend upon the angle of incidence $\theta$. A yield enhancement peak occurs at $\theta=0°$ , i.e., where the *p*-polarized light impinges "normal" to the grating. Where $\theta \neq 0$, satellite peaks are formed. Thus it can be appreciated that any of numerous mechanical means may also be provided in combination with photoemitter 10 to vary the direction of polarization and/or the angle of incidence $\theta$ for the light focused to impinge thereon to provide variable "tuning" of the amplitude and/or the wavelengths of peak response.

An analysis of curve 26, shows that a resonant surface wave, having the same frequency as a 0.93 micron free space wavelength light wave, has a surface wave wavelength equal to the grating periodicity *b* of approximately 0.88 microns (established by scanning electron microscope studies of the grating surface).

By way of further illustration, the grating periodicity *b* may be predetermined to provide a tuned peak response in the yield response curve at particularly desirable wavelengths. For example, a tuned peak response for this embodiment may be obtained at the important laser line wavelength of 1.06 microns by constructing a grating with a periodicity b approximately equal to 1.0 micron [i.e., (0.88/0.93) × 1.06 microns].

The coupling phenomenon previously discussed in the general theory may only be excited by the component of light having a polarization with a magnetic vector parallel to the direction (Z) of the grating (i.e., *p*-polarized light focused to impinge in a plane of incidence perpendicular to the direction of the discontinuities). Numerous other embodiments may also be constructed. For example, FIGS. 2 and 3 depict other examples of the novel photoemitter wherein similar numbers are utilized to designate portions of the respective embodiments which perform similar functions as those of corresponding portions of the embodiment of Example 1.

EXAMPLE 2

Figures 2, 3:
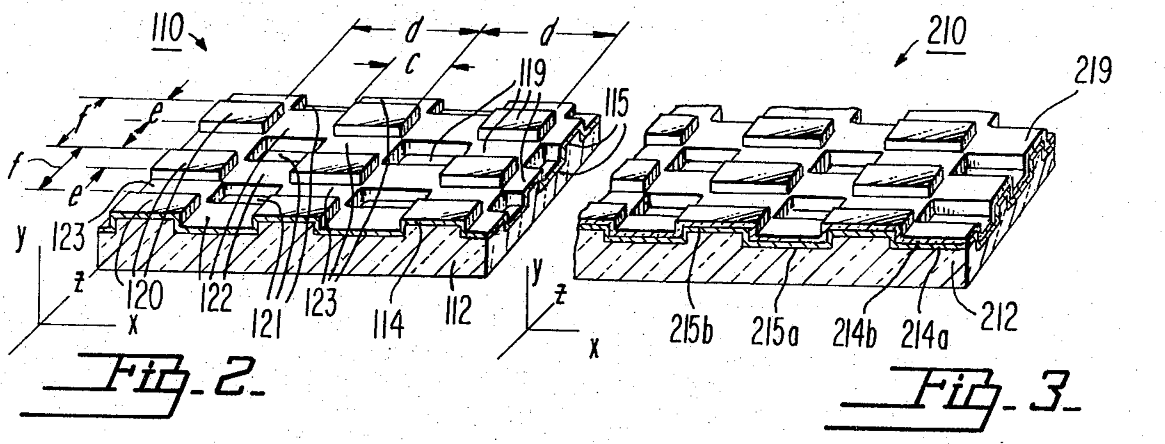

Referring now to FIG. 2, there is shown an example of the novel photoemitter 110 similar to Example 1 wherein the excitation of the energy coupling phenomenon occurs for light impinging on the surface 119 having a component of polarization perpendicular to either direction X or Z. The major surface of the photoemitter 110 includes a reticular grating surface 119 having alternate spaced-apart surface regions 120–123. The photoemitter 110 is fabricated by means of the application of the techniques and procedures described for Example 1 upon correspondingly similar materials. In the fabrication of the photoemitter 110, a substrate 112 is initially etched to include alternating slotted and non-slotted regions (analogous to 16 and 18 of FIG. 1) in the direction Z with a periodicity *d*. However, unlike Example 1, the substrate etching process is repeated in the dimensions perpendicular to the first grating dimensions to form substantially perpendicular and similar slotted regions in the direction X having a periodicity *f*. A photoemissive material 114 of substantially uniform thickness is then formed on the twice slotted major surface 115 to define a 3 level reticular grating surface 119 having alternate surface regions 120–123 formed in accordance with a reticular (checkerboard-like) pattern. Thus, slotted regions 120 comprise 1/4 of the major surface 119 and are in spaced relation to the lowest level regions 121 (which comprise another 1/4 of the major surface 119) a distance of 2*h*. Regions 122 and 123 (formed by separate etching processes) comprise the balance of surface 119 and are in spaced relation from regions 120 and 121 a distance of *h*.

Viewed progressively along a cross-section in the direction X, each successive pair combination of alternate surface regions 120 and 122, or 121 and 123 forms a single discontinuity of approximately equal width *d*. Viewed progressively along a cross-section in the direction Z, each successive pair combination of alternate regions 120 and 123, or 121 and 122, forms a single discontinuity which is of approximately equal width *f*. For simplicity, periodicity *f* is selected to equal the periodicity *d* and the aspect ratios *c/d* and *e/f* are selected to equal about 0.5. As stated herein in Example 1, considerable variation in these parameters may be accomplished without deviating from the inventive concept.

EXAMPLE III

Referring now to FIG. 3, there is shown another embodiment of the novel photoemitter which may be described broadly as a laminated metal-semiconductor-photoemitter. A glass substrate 212, for example, is etched in a manner similar to substrate 112 shown in Example II and a metal-like material **214*a* such as, for example, aluminum is formed with equal thickness on its slotted major surface thereby fashioning thereon discontinuities similar to the regions 120–123 of Example II. A transparent, or semitransparent, semiconductive photoemissive material 214***b*, such as for example CsSb, is disposed or formed with equal thickness on the major surface 215*b* preferably with a thickness of between about 50A and 500A. However, the optimal thickness for other semiconductive photoemissive materials may vary depending upon their transparency and photoemissive characteristics. In this case, the lower limit of approximately 50A was selected to insure that a majority of the surface wave energy would be absorbed by the semiconductor rather than the metal substrate. The upper limit of thickness was set to prevent the semiconductor from absorbing so much energy that the surface wave excitation and "resonance" would be effectively destroyed.

The transparency of various semiconductive photoemissive materials may vary significantly for various individual wavelengths of impinging light. Generally, any photoemissive semiconductive material which becomes transparent or semitransparent at particular light wavelengths within its photosensitivity range may be effectively utilized for the photoemissive material 214*b*. For example, like most semiconducting photoemissive materials, CsSb becomes highly transparent at its longer but less sensitive wavelengths of photosensitivity (i.e., wavelengths approaching threshold) thereby permitting light at these longer wavelengths to pass through photoemissive material 214*b* to impinge on the metal-like reflective grating surface 215*b*. For intermediate wavelengths and lower, the photoemissive semiconductor is not highly transparent and functions primarily as an electron emitter whose electron emission is excited directly by the impinging photon energy. Thus, light at wavelengths approaching threshold impinges upon a metal-like reticular grating surface 215*b* having discontinuities similar to those formed by alternating regions 120–123 of Example II to induce the energy coupling phenomenon previously described. Thus, the photoemitter is particularly useful for enhancing the yield of semiconductive photoemissive materials at their longer, but normally less sensitive, wavelengths of photosensitivity approaching threshold.

GENERAL CONSIDERATIONS

Numerous variations of the medium (grating configuration and composition) are possible which permit "tuning" of the photoemissive yield curve of non-thermionic photoemissive materials without deviating from the inventive concept. For example, a metal-like self-supporting material may be utilized for the medium which may be etched and/or otherwise prepared (e.g., surface roughening techniques) to include the required discontinuities or, alternatively, it may be fabricated as herein on a supporting substrate. Also, the photoemitter need not be of the reflective mode. A transmissive mode photoemitter may be constructed by persons skilled in the art by the use of appropriate semitransparent metal-like materials in the formation of the required medium.

Examples I and II depict the novel photoemitter in its simplest form. Its simplicity is the result of the utilization of a metal-like photoemissive material such as silver-oxygen- cessium which is formed to include a reflective medium on one of its major surfaces upon which light impinges directly. The medium required to excite the energy coupling phenomenon is thereby incorporated directly into the photoemissive material's surface. The more complex Example III provides a medium in separate laminate relation to a photoemissive material.

The invention conceived is broadly applicable to a wide range of photosensitive devices or systems which respectively utilize non-thermionic photocathode materials or detectors. Broadly, the invention consists of including a medium within a photoemitter to excite the energy coupling phenomenon herein described from an incident light wave to a surface wave confined to propagate along and be absorbed into the surface of a photoemissive material to excite enhanced electron emission therefrom at discrete wavelengths. Notably, the "excitation" of the energy coupling phenomenon in applicant's device is a phenomenon separate and distinct from the absorption and consequent "excitation of electron emission" thereafter, which is normally associated with a photoemissive material. I have found that the trapped surface wave supported by the photoemissive material is quickly absorbed and propagates only a distance of less than 20 microns thereby permitting the use of the novel device in systems having stringent resolution requirements.

The discontinuities of the medium may be selected to produce one or more tuned peak responses in the photosensitive range of the photoemissive material of the structure. The discontinuities may exist in one direction only (for example Example I) or may exist in a multiplicity of directions (Examples II and III.) The latter structure permits the excitation of the energy coupling phenomenon with incident light polarized in either direction relative to the orientation of the discontinuities. Also, the periodicity *b* (FIG. 1), *e* and/or f (FIGS. 2 and 3) may be substantially periodic (i.e., unchanged) along the surface or may be permitted to vary to provide photoemissive yield enhancement at multiple wavelengths. Several mediums having well defined but different periodicities, or continually variable periodicity, may be for example overlayed on the same structure to excite tuned peak responses in photoemission at several incident light wavelengths and/or continually varying wavelengths.

As shown roughly in FIG. 1, the angle of incidence for light impinging on the photoemitter and/or its plane of polarization may be varied to provide additional tuning of the amplitude and/or wavelengths of peak response. Numerous mechanical arrangements may be utilized for accomplishing this result.

The term "grating", used herein for simplicity of expression is intended in its broadest sense to encompass any arrangement of the discontinuities and/or their orientation without restriction except as enumerated.

I claim:

1. A photoemitter for emitting electrons in response to an incident light wave impinging thereon, comprising:

a highly reflective medium having periodic discontinuities dimensioned to achieve energy coupling from an incident light wave impinging on a surface of said medium to a surface wave confined to propagate along and be absorbed into photoemissive material of the photoemitter to excite a tuned peak of electron emission therefrom at at least one discrete and preselected wavelength of said incident light, said discontinuities having a periodicity of spacing substantially equal to the wavelength of said surface wave at at least one tuned peak of electron emission.

2. A photoemitter in accordance with claim 1, wherein said discontinuities have a periodicity substantially related to the frequency, angle of incidence and polarization of said incident light wave, and the wavelength of said surface wave.

3. A photoemitter in accordance with claim 2, wherein said discontinuities are located on the surface of said medium upon which said incident light wave impinges.

4. A photoemitter in accordance with claim 3, wherein said periodicity is substantially equal to the wavelength of a surface wave which would be excited by an incident light wave normally incident to said medium and having its polarization perpendicular to an axis of said discontinuities.

5. A photoemitter in accordance with claim 3, wherein said medium consists of a metal-like material.

6. A photoemitter in accordance with claim 5, wherein said medium is formed with a metal-like photoemissive material.

7. A photoemitter in accordance with claim 6, wherein said photoemitter additionally includes a substrate of supporting material for said medium.

8. A photoemitter in accordance with claim 7, wherein said discontinuities are formed by alternating pair combinations of slotted and non-slotted regions extending along a surface of said supporting substrate upon which a substantially uniform thickness of said photoemissive material is disposed.

9. A photoemitter in accordance with claim 8, wherein various one of said slotted and non-slotted regions are of substantially rectangular cross-section, substantially parallel in orientation to each other, and repeat with substantially equal periodicity along that cross section.

10. A photoemitter in accordance with claim 8, wherein said photoemissive material consists of a silver-oxygen-cessium electron emissive material.

11. A photoemitter in accordance with claim 8, wherein said discontinuities are formed by pair combinations of non-slotted, once slotted and twice slotted surface regions on said substrate.

12. A photoemitter in accordance with claim 11, wherein said pair combinations of non-slotted, once slotted and twice slotted surface regions are arranged in a reticular manner.

13. A photoemitter in accordance with claim 11, wherein various ones of said non-slotted, once slotted and twice slotted surface regions are of substantially rectangular cross section, substantially parallel in orientation to each other and repeat with substantially equal periodicity in at least one cross section.

14. A photoemitter in accordance with claim 11, wherein said photoemissive material consists of a silver-oxygen-cessium electron emissive material.

15. A photoemitter in accordance with claim 5, wherein said photoemissive material comprises a semiconductor which is transparent to light of said preselected wavelength of enhanced photosensitivity.

16. A photoemitter in accordance with claim 15, wherein said photoemissive material substantially comprises CsSb.

17. A photoemitter in accordance with claim 15, wherein said medium is interposed in a laminated structure between a lamina of said photoemissive material and a substrate of supporting material for said medium.

* * * * *